Sept. 22, 1970  JUN NISHIDAI  3,530,502
CAPACITOR POTENTIAL DEVICE
Filed Dec. 5, 1967
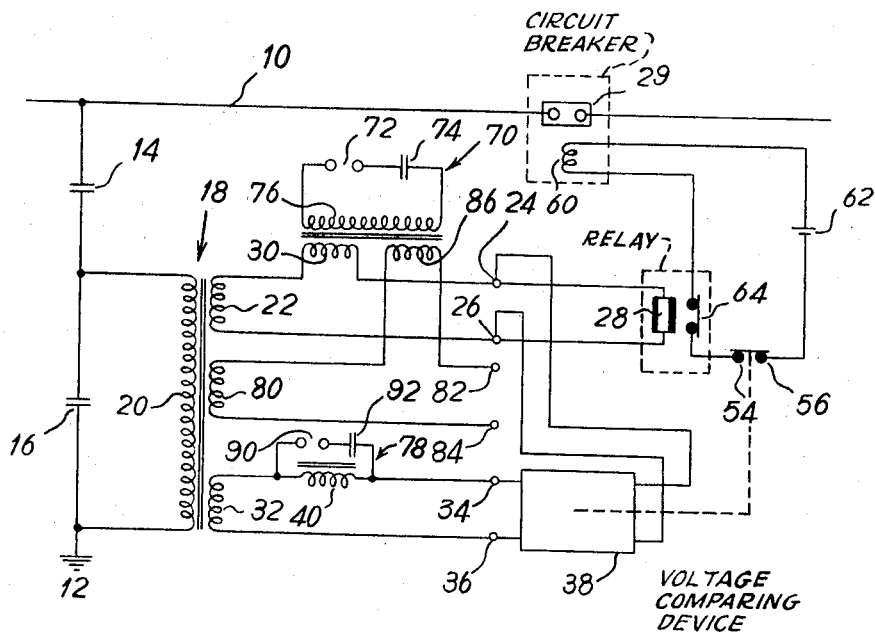
Fig. 1
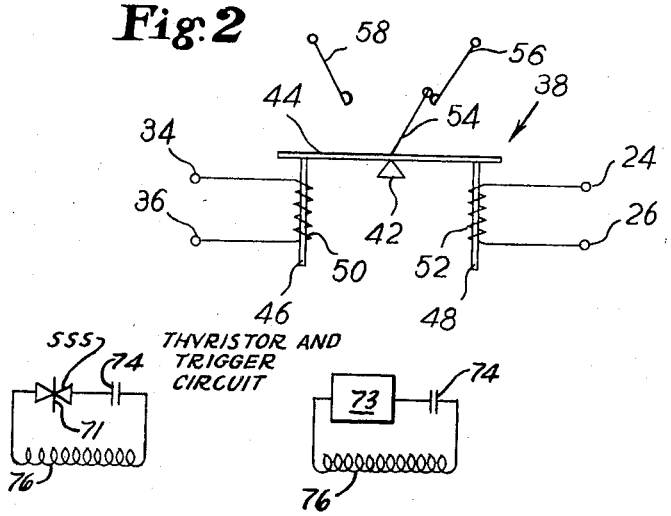
Fig. 2
Fig. 3
Fig. 4
JUN NISHIDAI
INVENTOR
BY Christensen,
Sanborn & Matthews
ATTORNEY

United States Patent Office 3,530,502
Patented Sept. 22, 1970

3,530,502
CAPACITOR POTENTIAL DEVICE
Jun Nishidai, Kyoto, Japan, assignor to Nissin Electric Co., Ltd., Kyoto, Japan, a company of Japan
Filed Dec. 5, 1967, Ser. No. 688,254
Claims priority, application Japan, Dec. 9, 1966, 41/80,818
Int. Cl. H02h 7/16
U.S. Cl. 317—12      8 Claims

ABSTRACT OF THE DISCLOSURE

A capacitor potential device for distinguishing between fault conditions in a high voltage system line and fault conditions in the secondary circuit of the device itself, to which various burdens (loads) are connected. The device includes a transformer with its primary winding capacitively coupled to the system line and having two or more secondary windings provided with reactors connected across each. The voltage across one of the secondary windings is applied to a burden or load. Means are provided for comparing the voltages induced in the secondary windings and providing a first indication when a fault condition occurs in the system line causing a first relationship between the secondary voltages, and providing a second indication when a fault condition occurs in the secondary circuit itself causing a second relationship between the secondary voltages. The resulting indications or signals are utilized to monitor faults in the system line or in the secondary circuit, and the former can be used to operate a circuit breaker in the system line.

BACKGROUND AND SUMMARY OF THE INVENTION

This invention relates to a capacitor potential device provided with means for distinguishing between faults such as a short circuit condition in the high voltage system line and those in the secondary side of the device to which various burdens are connected.

As is well known, a capacitor potential device (to be referred to as a CPD hereinafter) is used to obtain a low voltage from a high system line voltage through a shunt capacitor. The low voltage obtained is used as an operating voltage for various burdens such as, for example, a relay for tripping a circuit breaker connected in the system line. When such a fault has occurred to the system line, a decay of the secondary voltage of the CPD operates the tripping relay to cause the circuit breaker to open the system line. However, if a fault occurs in the secondary side of the CPD and yet the relay operates the breaker, it certainly is inconvenient. Therefore, it is advisable to distinguish faults in the high voltage system line from those in the secondary side of the CDP.

Various attempts have been made to enable such distinction. In one of them, a main transformer and a subsidiary transformer have their respective primary windings connected across the shunt capacitor of a CPD, with a burden being connected to the secondary of the main transformer, and a means is connected to the secondary windings of the two transformers for comparing the voltages induced therein. With this arrangement, when a fault occurs in the system line, the voltages induced in the two secondary windings will both drop to zero, whereas when a fault occurs in one of the secondary circuits, the voltage induced in this circuit alone will drop to zero. Thus, it is possible to tell whether the fault has occurred in the system line or in the secondary circuit. However, this prior art arrangement requires two transformers to be connected across the shunt capacitor of a CPD, with a resulting increase in the size and cost of the device.

Accordingly, the primary object of the invention is to provide a CPD which is capable of distinguishing faults in the high voltage system line from those in the secondary circuit of the device and which is provided with means for preventing the erroneous operation of the relay when the fault is in the secondary circuit.

Another object of the invention is to provide a CPD in which a single transformer can provide an operating voltage for each of a plurality of burdens independently and without affecting the operating voltages for the other burdens.

The invention will be better understood from the following description of a preferred embodiment thereof with reference to the accompanying drawings, wherein:

FIG. 1 is a circuit diagram of one embodiment of the invention; and

FIG. 2 is a schematic drawing of the voltage comparison device shown in FIG. 1.

FIGS. 3 and 4 are circuit diagrams of alternative arrangements for portions of the system of FIG. 1.

Referring to FIG. 1, there is shown a series combination of a coupling capacitor 14 and a shunt capacitor 16 connected between a system line 10 and ground 12. The two capacitors 14 and 16 reduce a high voltage on the line 10 to a sufficiently low level. A transformer 18 has one primary winding 20 connected across the shunt capacitor 16 and more than two secondary windings. Between the terminals 24 and 26 of one secondary winding 22 of the transformer there is connected a relay 28 such as a tripping relay for a circuit breaker 29 inserted in the system line. As is well known, a resonant reactor 30 is connected in series with the secondary winding 22, and has such an impedance value converted on the primary side of the transformer 18 that, with the combined parallel capacitance of the capacitors 14 and 16, it satisfies the condition for series resonance at the rated frequency.

Another secondary winding 32 of the transformer 18 has its opposite terminals 34 and 36 connected to a voltage comparing device shown by a block 38 in FIG. 1, wherein the secondary voltage of the transformer appearing between the terminals 34 and 36 is compared with the voltage between the terminals 24 and 26.

A reactor 40 is connected in the other secondary winding circuit 32. Just like the reactor 30, the impedance of the reactor 40 preferably is such that it satisfies the resonant condition. However, if the burden connected between the terminals 34 and 36 is not so heavy, and if not so accurate a ratio is required between the line voltage and the secondary voltage of the transformer, the reactor 40 need not be of such an impedance value as to satisfy the resonant condition but simply to perform a current limiting function on occurrence of a short circuit condition between the terminals 34 and 36.

The device 38 may comprise, for example, a lever 44 fulcrumed at 42 and a pair of iron plungers 46 and 48 fixed to the opposite ends of the lever 44 and adapted to be pulled by a pair of coils 50 and 52. The coil 50 is connected to the terminals 34 and 36 and the coil 52, to the terminals 24 and 26. The lever 44 carries a movable contact 54 which can be selectively brought into contact with a pair of fixed contact 56 and 58 upon inclination of the lever on the fulcrum.

So long as the CPD operates normally, both coils 50 and 52 are kept energized to pull in the respective plungers 46 and 48, so that the lever 44 is held in the horizontal position as shown, with the contact 54 being in touch with the contact 56. However, when the pulling forces of the two coils 50 and 52 become unbalanced, as will be described later in detail, the lever 44 is tilted counter-clockwise on the fulcrum 42 so as to switch the contact arm 54 over to the opposite fixed contact 58.

The tripping relay 28 has a normally closed contact 64 connected in series with the contacts 54 and 56 and a tripping coil 60 to a source 62. The contacts 54 and 58 may be connected to the energizing circuit of an alarm buzzer, not shown. When the tripping relay 28 is energized, its contact 64 is opened so that the coil 60 will not be energized even when the contact 54 touches the contact 56. When the relay 28 is deenergized, the contact 64 is closed so that the coil 60 is energized to operate the circuit breaker 29 in the system line 10. However, when the lever 44 is tilted to remove the contact 54 from the contact 56, the coil 60 will never be energized even when the relay 28 is deenergized to close its contact 64. Thus, the contacts 54 and 56 function to prevent the energization of the tripping coil 60. The arrangement may also be such that the device 38 prevents the operation of the relay 28 when the pulling forces of the two coils 50 and 52 become unbalanced.

A shunt circuit 70 is connected across the resonant reactor 30. The circuit 70 becomes conductive when the terminal voltage across the reactor 30 has exceeded a predetermined level. When the circuit 70 becomes conductive, it forms a parallel resonant circuit with the reactor 30. The circuit 70 may comprise a series combination of a capacitor 74 and an element which becomes conductive upon application thereto of a voltage higher than a predetermined level, such as, for example, a discharge air gap 72. In the illustrated embodiment, the circuit 70 is connected across a reactor 76 electromagnetically coupled with the reactor 30. Equivalently, however, the shunt circuit 70 may be considered as being connected directly across the reactor 30.

Another shunt circuit 78 is connected across the reactor 40. The circuit 78 becomes conductive when the terminal voltage of the reactor 40 has exceeded a predetermined level. The circuit 78 may also comprise a series combination of a discharge air gap 90 and a capacitor 92 and, when rendered conductive, forms a parallel resonant circuit with the reactor 40.

Under the normal operating condition of the CPD, the relay 28 is in its operative condition with its contact 64, opened, and the pulling forces on the lever 44 of the device 38 are balanced to keep the contact 54 in touch with the contact 56. Under the condition, when a fault such as a short circuit condition occurs in the system line 10, the primary voltage of the transformer 18 and consequently the secondary voltage on the windings 22 and 32 thereof drop to zero, whereupon the relay 28 is deenergized to close its contact 64. On the other hand, since the voltages across the coils 50 and 52 have both dropped to zero, the lever 44 is kept in its horizontal position, thereby maintaining the contacting condition of the contacts 54 and 56. As a result, the tripping coil 60 is energized from the source 62 to operate the circuit breaker to break the system line 10.

Suppose that, under the normal condition of the system line, a fault such as a short circuit condition has occurred between the terminals 24 and 26. Then, the coil 52 is deenergized, and the terminal voltage of the reactor 30 increases substantially to the same level as the induced voltage across the secondary winding 22 of the transformer. This increased voltage causes a discharge to take place across the gap 72, thereby rendering the shunt circuit 70 conductive. Equivalently, this means that the capacitor 74 is connected in parallel with the reactor 30. The parallel combination of the reactor 30 and the capacitor 74 forms a parallel resonant circuit, which provides an impedance high enough to block the short circuit current through the secondary circuit of the transformer. As a result, the voltage induced in the secondary winding 32 of the transformer is kept substantially unchanged, so that the current through the coil 50 is kept substantially unchanged. As a result, the pulling forces on the plungers 48 and 46 become unbalanced so that the lever 44 is tilted counter-clockwise thereby to switch the contact 54 from 56 over to 58. This prevents energization of the tripping coil 60 even though the contact 64 of the relay 28 has been closed and at the same time causes the alarm buzzer to sound. Thus, distinction can be made between the the fault conditions in the system line and that in the tripping relay circuit.

The function of the shunt circuit 78 connected across the reactor 40 is the same as that of the above-mentioned circuit 70, so that no further explanation will be required.

In accordance with the present invention, the transformer 18 can supply electric energy to a plurality of burdens, by providing as many secondary windings as there are burdens to be connected, although in FIG. 1 one such additional secondary winding 80 is shown having opposite terminals 82 and 84. An additional burden, not shown, may be connected to the terminals and comprise a ground relay, for example, operable in cooperation with another CPD for another phase of the system line. To provide a shunt circuit for the secondary winding 80, a reactor 86 having a resonance characteristic similar to that of the reactor 30 may be connected to the winding 80 and electromagnetically closely coupled with the reactor 30 so that they work as mutual reactors. The condition that the two reactors should work as mutual reactors is important. If electric energy is supplied selectively to the burden connected between the terminals 24 and 26 and to the burden connected between the terminals 82 and 84, in other words, so long as both the burdens are not supplied with electric energy at the same time, each of the reactors 30 and 86 may independently satisfy the condition for a resonance with the capacitors 14 and 16, and there will be no problem. However, if the two burdens are supplied with electric energy at the same time, the reactors would not satisfy the condition for a resonance with the capacitors 14 and 16. As the reactors 30 and 86 are so arranged as to work as mutual reactors, the terminal voltages across the reactors are always equal. Consequently, if one of the reactors satisfies the resonant condition, so does the other reactor. With this arrangement, it is possible to supply a plurality of burdens simultaneously from a single transformer without any trouble.

Two burdens are provided in the illustrated embodiment, but as many of them as are desired may be provided, with corresponding reactors connected to the respective secondary windings and electromagnetically closely coupled with each other so as to work as mutual reactors.

In place of the air gap 72 or 90, any other conductive element which becomes conductive upon application thereto of a voltage higher than a predetermined level, such as a silicon symmetrical switch (SSS) 71 or a thyristor 73, may also be employed, as shown in FIGS. 3 and 4, respectively. The circuits illustrated in these figures may be substituted either for shunt circuit 70, as indicated by the numerals used, or for shunt circuit 78, of FIG. 1. In FIG. 4, block 73 represents the thyristor and a triggering circuit coupled thereto, including a starting gap (not shown) to effect the starting thereof.

What I claim is:

1. A capacitor potential device comprising: a series combination of a coupling capacitor and a shunt capacitor adapted to be connected between a system line and ground; a transformer having a primary winding connected across said shunt capacitor and at least two secondary windings; a resonant reactor connected to one of said secondary windings; a reactor connected to the other of said secondary windings; a burden to which the voltage induced across said one secondary winding is applied; and means for comparing the voltages induced in said secondary windings including means for providing a first indication when said voltages bear a first predetermined relationship to each other resulting from a fault condition in said system line and providing a second indication when said voltages bear a second predetermined relationship to each other resulting from a fault condition in said one secondary winding, thereby to distinguish between fault conditions in said system line and those in said one secondary winding.

2. The device of claim 1, wherein said load is a tripping relay which, when a fault occurs to said line, operates a circuit breaker connected in said system line, and further including means for preventing the tripping operation of said relay when said voltage comparing means detects a difference between said two induced voltages.

3. The device of claim 1, further including a shunt circuit connected substantially across said resonant reactor and comprising a series combination of a conductive element which is rendered conductive when the voltage applied thereto has exceeded a predetermined level and a capacitor which forms a parallel resonant circuit with said resonant reactor.

4. The device of claim 3, wherein said conductive element is a discharge air gap.

5. The device of claim 3, wherein said conductive element is a thyristor.

6. The device of claim 3, wherein said conductive element is a silicon symmetrical switch.

7. The device of claim 1, wherein said transformer includes a third secondary winding to which are connected a second burden and a second resonant reactor electromagnetically closely coupled with said first resonant reactor.

8. The device of claim 7, further including a shunt circuit connected across said first resonant reactor and comprising a series combination of a conductive element which is rendered conductive when the voltage applied thereto has exceeded a predetermined level and a capacitor which forms a parallel resonant circuit with said first resonant reactor.

References Cited

UNITED STATES PATENTS

| | | | |
|---|---|---|---|
| 1,454,474 | 5/1923 | Huebner | 317—31 X |
| 2,931,950 | 4/1960 | Minder | 317—31 X |
| 3,401,304 | 9/1968 | Woodworth | 317—12 |

JAMES D. TRAMMELL, Primary Examiner

U.S. Cl. X.R.

317—27, 31